(12) United States Patent
Adachi et al.

(10) Patent No.: US 6,765,855 B1
(45) Date of Patent: Jul. 20, 2004

(54) SIGNAL DETECTION CIRCUIT FOR OPTICAL DISK

(75) Inventors: Yasushi Adachi, Tokyo (JP); Kazuhiro Okamoto, Tokyo (JP); Yutaka Onoguchi, Tokyo (JP); Masaaki Katoh, Tokyo (JP)

(73) Assignees: Renesas Technology Corp., Tokyo (JP); Mitsubishi Electric Engineering Co., Ltd., Tokyo (JP)

( * ) Notice: Subject to any disclaimer, the term of this patent is extended or adjusted under 35 U.S.C. 154(b) by 687 days.

(21) Appl. No.: 09/588,296

(22) Filed: Jun. 7, 2000

(30) Foreign Application Priority Data

Feb. 16, 2000 (JP) ........................................ 2000-038643

(51) Int. Cl.[7] ................................................ G11B 5/09
(52) U.S. Cl. ................................ 369/59.17; 369/59.18; 369/124.15
(58) Field of Search .......................... 369/59.17, 59.18, 369/124.15, 124.14, 30.1, 59.2, 47.27, 47.31, 59.16

(56) References Cited

U.S. PATENT DOCUMENTS 5,412,632 A * 5/1995 Mita et al. ................ 369/47.27
5,710,750 A * 1/1998 Tachibana ................ 369/59.16
5,963,518 A * 10/1999 Kobayashi et al. ....... 369/47.27
6,301,201 B1 * 10/2001 Takeya ...................... 369/30.1

FOREIGN PATENT DOCUMENTS

| JP | 59-40326 | 3/1984 |
| JP | 60-13362 | 1/1985 |
| JP | 3-16029 | 1/1991 |
| JP | 7-192285 | 7/1995 |
| JP | 9-237459 | 9/1997 |
| JP | 10-106160 | 4/1998 |

* cited by examiner

Primary Examiner—Tan Dinh
Assistant Examiner—Kimlien Le
(74) Attorney, Agent, or Firm—Leydig, Voit & Mayer, Ltd.

(57) ABSTRACT

In a signal detection circuit for an optical disk, a comparator converts an analog HF signal into a digital HF signal by using a slice level. A dropout detection circuit detects a dropout of the digital HF signal. A charge-pump circuit feeds back a slice-level control voltage to the comparator based on a result of the detection by the dropout detection circuit. A voltage follower holds and outputs a voltage stored in the capacitor. A switch is turned OFF when a dropout signal has been detected, and outputs to the voltage follower the voltage that has been stored in the capacitor during an ON state of the switch. A second switch is turned ON when a dropout signal has been detected, and applies an output of the voltage follower to the comparator.

2 Claims, 8 Drawing Sheets

US 6,765,855 B1

SIGNAL DETECTION CIRCUIT FOR OPTICAL DISK

FIELD OF THE INVENTION

The present invention relates to a signal detection circuit for an optical disk which detects and reproduces a signal recorded on the optical disk such as a CD (compact disk) or a CD-ROM. More particularly, this invention relates to a signal detection circuit for an optical disk which properly carries out slice-level control of a signal at the time of converting an analog signal read through a pick-up into a digital signal.

BACKGROUND OF THE INVENTION

Conventionally, for reproducing information recorded on an optical disk, an analog HF signal read from the optical disk has been converted into a digital HF signal based on a predetermined slice level. In many cases, information is recorded onto an optical disk as the information of an EFM (Eight-to-Fourteen Modulation) signal of which the DC component of the signal becomes zero. Therefore, at the time of the analog/digital conversion, the slice level is controlled to become a central voltage level of the analog HF signal.

FIG. 8 is a block diagram that shows a construction of a conventional signal detection circuit for an optical disk. In FIG. 8, an analog HF signal S101 read from an optical disk by a pick-up (not shown) is input to a terminal T101. A capacitor C101 cuts a DC component of the input analog HF signal S101, and outputs an analog HF signal S102, from which the DC component has been cut out. ADC signal of a slice-level control voltage $V_{TLC}$ that is input through a resistor R102, which will be explained later, is superimposed on the analog HF signal S102. The analog HF signal S102 is then input to a minus (−) terminal of a comparator 101 as an analog HF signal S102a which has been superimposed the DC signal of the slice-level control voltage $V_{TLC}$.

A reference voltage $V_{ref}$ is input to a plus (+) terminal of the comparator 101. The comparator 101 compares the analog HF signal S102a with the reference voltage $V_{ref}$, and outputs a result of the comparison as a digital HF signal S103. In other words, the comparator 101 executes an analog/digital conversion for converting the analog HF signal S102a into the digital HF signal S103.

The digital HF signal S103 output from the comparator 101 is input to a digital signal processing circuit 103. The digital signal processing circuit 103 processes the input digital HF signal S103 to reproduce a voice signal and a video signal, and outputs these signals.

Further, the digital HF signal S103 output from the comparator 101 is input to a charge-pump circuit 104. The charge-pump circuit 104 controls charge/discharge volumes to be applied to a capacitor C102 so that a plus (+) side electrode voltage of the capacitor C102 becomes a proper slice-level control voltage $V_{TLC}$ corresponding to an average DC level of the input digital HF signal S103. This slice-level control voltage $V_{TLC}$ is input to the minus (−) terminal of the comparator 101 through a resistor R102.

In other words, the reference voltage $V_{ref}$ is constant when the comparator 101 executes the analog/digital conversion. Therefore, based on the control of the charge/discharge volumes of the capacitor C102, the charge-pump circuit 104 feedback-controls the slice-level control voltage $V_{TLC}$ at a connection point P101 that is superimposed on the analog HF signal S102. Further, the charge-pump circuit 104 controls the central voltage level of the analog HF signal S102 so that the voltage relatively becomes the reference voltage $V_{ref}$ at the time of the analog/digital conversion. In this case, the digital HF signals S103 output from the comparator 101 include high-level signals and low-level signals that are generated uniformly. Therefore, the charge-pump circuit 104 detects an average DC level of the input digital HF signals S103 to control the charge/discharge volumes of the capacitor C102.

The digital HF signal S103 output from the comparator 101 is input to a dropout-signal detection circuit 102. The dropout-signal detection circuit 102 detects an envelope SE of the digital HF signal S103 by using, for example, a peak-holding circuit. When the voltage level of this envelope has become a predetermined value or lower, the dropout-signal detection circuit 102 outputs a signal S104 that shows the occurrence of a dropout signal (dropout) to a charge-pump circuit 104. This dropout signal is generated by the scratch of an optical disk or by the oscillation of the optical disk at the time of reading.

When the signal S104 that shows the occurrence of a dropout signal has been input to the charge-pump circuit 104, the charge-pump circuit 104 sets the output to the OFF state, that is, a high-impedance state, and maintains the slice-level control voltage $V_{TLC}$ at the connection point P101.

FIG. 9 is a timing chart that shows a slice-level operation when a dropout signal has occurred in the conventional signal detection circuit for an optical disk. In FIG. 9, when a dropout E101 has occurred in an input analog HF signal S102, the voltage of an envelope SE of a digital HF signal S103 becomes a predetermined value or lower. A dropout-signal detection circuit 102 detects a dropout signal, and outputs a signal S104 to a charge-pump circuit 104. This signal S104 is kept being output until when the voltage level of the envelope SE has exceeded a predetermined value. During a period while this signal S104 is in the ON state, the charge-pump circuit 104 keeps the output in the OFF state, and holds the slice-level control voltage $V_{TLC}$ at a point tbb when the dropout signal has been detected.

With this arrangement, the slice-level control voltage $V_{TLC}$ is forcibly set to a high level. Therefore, even when a dropout signal has occurred and the analog HF signal S102 has come to contain only a noise component, it is possible to prevent this erroneous digital HF signal S103 from being output to the digital signal processing circuit 103.

The above-described conventional signal detection circuit for an optical disk, however, has the following drawbacks. The charge-pump circuit 104 operates as if there has occurred no dropout signal during the period from a time taa when the analog HF signal S102 has actually become a dropout signal to the time tbb when the dropout-signal detection circuit 102 has detected the dropout signal. During this period, the charge-pump circuit 104 charges the capacitor C102, and controls the slice-level control voltage $V_{TLC}$ from increasing, based on a time constant determined by the capacitor C102 and the resistor R102. Therefore, the slice-level control voltage $V_{TLC}$ varies. As a result, the signal detection circuit detects unnecessary signals such as noise, and outputs an erroneous digital HF signal S103 to the digital signal processing circuit 103.

Further, a DC signal based on the slice-level control voltage $V_{TLC}$ increases or decreases depending on the time constant that is determined by the capacitor C102 and the resistor R102. Therefore, when there is no occurrence of a dropout signal, it is possible to obtain a more stable digital HF signal by setting the time constant to a larger value. However, when the time constant is set to a larger value, it takes a long time for the slice-level control voltage $V_{TLC}$ to recover to the normal level after there has been no dropout signal. Accordingly, when the time constant determined by the capacitor C102 and the resistor R102 is set to a small value, a variation occurs in the slice-level control voltage $V_{TLC}$ that is held after the dropout signal has been detected. In this case, there is also a problem that a wrong digital HF signal S103 is output to the digital signal processing circuit 103.

SUMMARY OF THE INVENTION

It is an object of the present invention to provide a signal detection circuit for an optical disk which can stably supply a slice-level control voltage $V_{TLC}$ when a dropout signal has occurred, and when a dropout signal has not occurred respectively, and which can detect and output a digital HF signal without an error.

According to one aspect of this invention, when a dropout-detection unit is in a normal state of not detecting a dropout of the analog signal, first and second voltage-storing units store voltages of slice levels controlled by a slice-level control unit. When the dropout-detection unit has detected a dropout of an analog signal, a voltage-holding unit holds the voltage of a slice level stored in a second voltage-storing unit. The voltage held by the voltage-holding unit is fed back to a converting unit. During the period of the dropout of the analog signal, the voltage-holding unit holds the voltage of the slice level at the time of the detection of the dropout of the analog signal, as an actual operation voltage.

According to another aspect of this invention, when a dropout-detection unit is in a normal state of not detecting a dropout of an analog signal, a voltage-storing unit stores a voltage of slice level controlled by a slice-level control unit. When the dropout-detection unit has detected a dropout of the analog signal, a voltage-holding unit holds the voltage of the slice level stored in the voltage-storing unit. The voltage held in the voltage-holding unit is fed back to a converting unit. During the period of the dropout of the analog signal, the voltage-holding unit holds the voltage of the slice level at the time of a detection of the dropout of the analog signal, as an actual operation voltage.

According to still another aspect of this invention, when the dropout-detection unit is in a normal state of not detecting a dropout of an analog signal, a third change-over switch is set to an OFF state. First to third voltage-storing units store voltages of slice levels controlled by a slice-level control unit. A slice level is controlled at the voltage stored in the first voltage-storing unit. In this case, a changeover control unit always controls first and second changeover switches to make the second and third voltage-storing units store voltages alternately; While the second voltage-storing unit stores the voltage, the voltage stored in the third voltage-storing unit is output to a voltage-holding unit. While the third voltage-storing unit stores the voltage, the voltage stored in the second voltage-storing unit is output to the voltage-holding unit. When a dropout-detection unit has detected the dropout of the analog signal, a third changeover switch is set to the ON state. The voltages stored in the second and third voltage-storing units are output alternately through the voltage-holding unit. The slice level is controlled at this voltage. With this arrangement, the slice level immediately before the occurrence of the dropout of the analog signal is used as the slice level at and after the point of time of the detection of the dropout of the analog signal. Thus, the voltage of the slice level is controlled securely and stably.

Further, the voltage-holding unit is realized by a voltage follower. Therefore, when a dropout of the analog signal has occurred, a voltage of the slice level is stably and surely supplied.

Other objects and features of this invention will become apparent from the following description with reference to the accompanying drawings.

DESCRIPTION OF THE PREFERRED EMBODIMENTS

Preferred embodiments of a signal detection circuit for an optical disk relating to the present invention will be explained in detail below with reference to the attached drawings.

Figure 1:
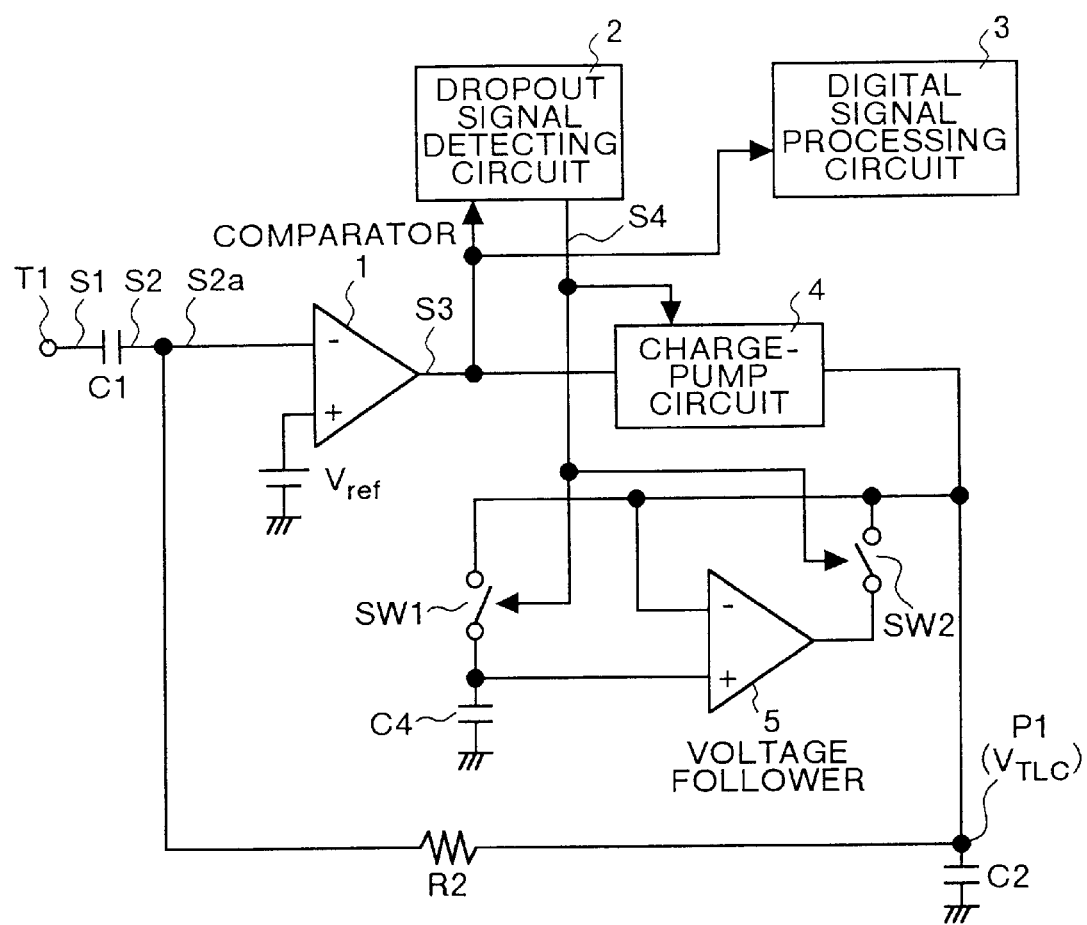
FIG. 1 is a block diagram that shows a construction of a signal detection circuit for an optical disk according to a first embodiment of the present invention.

FIG. 1 is a block diagram that shows a construction of a signal detection circuit for an optical disk according to the first embodiment of the present invention. The optical-disk signal detection circuit shown in FIG. 1 includes a witch SW1, a switch SW2, a capacitor C4 and a voltage follower 5 added to the structure of the optical-disk signal detection circuit shown in FIG. 7.

In FIG. 1, an analog HF signal S1 read from an optical disk by a pick-up (not shown) is input to a terminal T1. A capacitor C1 cuts a DC component of the input analog HF signal S1, and outputs an analog HF signal S2 from which has been cut out the DC component. A DC signal of a slice-level control voltage $V_{TLC}$ that is input through a resistor R2, which will be explained later, is superimposed on the analog HF signal S2. Thereafter, the analog HF signal S2 is input to a minus (−) terminal of a comparator 1 as an analog HF signal S2a on which has been superimposed the DC signal of the slice-level control voltage $V_{TLC}$.

A reference voltage $V_{ref}$ is input to a plus (+) terminal of the comparator 1. The comparator 1 compares the analog HF signal S2a with the reference voltage $V_{ref}$, and outputs a result of the comparison as a digital HF signal S3. In other words, the comparator 1 executes an analog/digital conversion for converting the analog HF signal S2a into the digital HF signal S3.

The digital HF signal S3 output from the comparator 1 is input to a digital signal processing circuit 3. The digital signal processing circuit 3 processes the input digital HF signal S3 to reproduce a voice signal and a video signal, and outputs these signals.

Further, the digital HF signal S3 output from the comparator 1 is input to a charge-pump circuit 4. The charge-pump circuit 4 controls charge/discharge quantities applied to a capacitor C2 so that a plus (+) side electrode voltage of the capacitor C2 becomes a proper slice-level control voltage $V_{TLC}$ corresponding to an average DC level of the input digital HF signal S3. This slice-level control voltage $V_{TLC}$ is input to the minus (−) terminal of the comparator 1 through a resistor R2.

In other words, the reference voltage $V_{ref}$ is constant when the comparator 1 executes the analog/digital conversion. Therefore, based on the control of the charge/discharge quantities of the capacitor C2, the charge-pump circuit 4 feedback-controls the slice-level control voltage $V_{TLC}$, at a connection point P1, that is superimposed on the analog HF signal S2. Further, the charge-pump circuit 4 controls the central voltage level of the analog HF signal S2 so that the voltage becomes the reference voltage $V_{ref}$ at the time of the analog/digital conversion. In this case, the digital HF signals S3 output from the comparator 1 include high-level signals and low-level signals that are generated uniformly. Therefore, the charge-pump circuit 4 detects an average DC level of the input digital HF signals S3 to control the charge/discharge volumes of the capacitor C2.

The digital HF signal S3 output from the comparator 1 is input to a dropout-signal detection circuit 2. The dropout-signal detection circuit 2 detects an envelope SE of the digital HF signal S3 by using, for example, a peak-holding circuit. When the voltage level of this envelope SE has become a predetermined value or lower, the dropout-signal detection circuit 2 outputs a signal S4 that includes the occurrence of a dropout signal (dropout) to the charge-pump circuit 4 and the switches SW1 and SW2. This dropout signal is generated by a scratch on an optical disk or by oscillation of the optical disk at the time of reading.

When the signal S4 has been input to the charge-pump circuit 4, the charge-pump circuit 4 sets its output to the OFF state, that is, a high-impedance state, and maintains the slice-level control voltage $V_{TLC}$ at the connection point P1.

On the other hand, the voltage follower 5 as a DC differential amplifier has its output terminal connected to the connection point P1 through the switch SW2 to produce the output to be fed back to the minus (−) terminal through the switch SW2 and the resistor R2. The grounded capacitor C4 is connected to the connection point P1 through the switch SW1. A potential of a contact point between the grounded capacitor C4 and the switch SW1, that is, a potential of a positive electrode of the capacitor C4, is input to a plus (+) terminal of the voltage follower 5.

The signal S4 from the dropout-signal detection circuit 2 is input to the switches SW1 and SW2. When the signal S4 has not detected a dropout signal, the switch SW1 is turned ON, i.e., closed, the switch SW2 is turned OFF, i.e., open. In other words, in a normal state of not detecting a dropout signal, the capacitor C4 is charge/discharge controlled by the charge-pump circuit 4 in a similar manner to that of the capacitor C2. On the other hand, when the signal S4 has detected a dropout signal, the switch SW1 is turned OFF and the switch SW2 is turned ON. In other words, immediately before the switch SW1 has swith to the OFF state, the voltage follower 5 holds the voltage stored in the capacitor C4, and outputs the voltage to the connection point P1.

Figure 2:
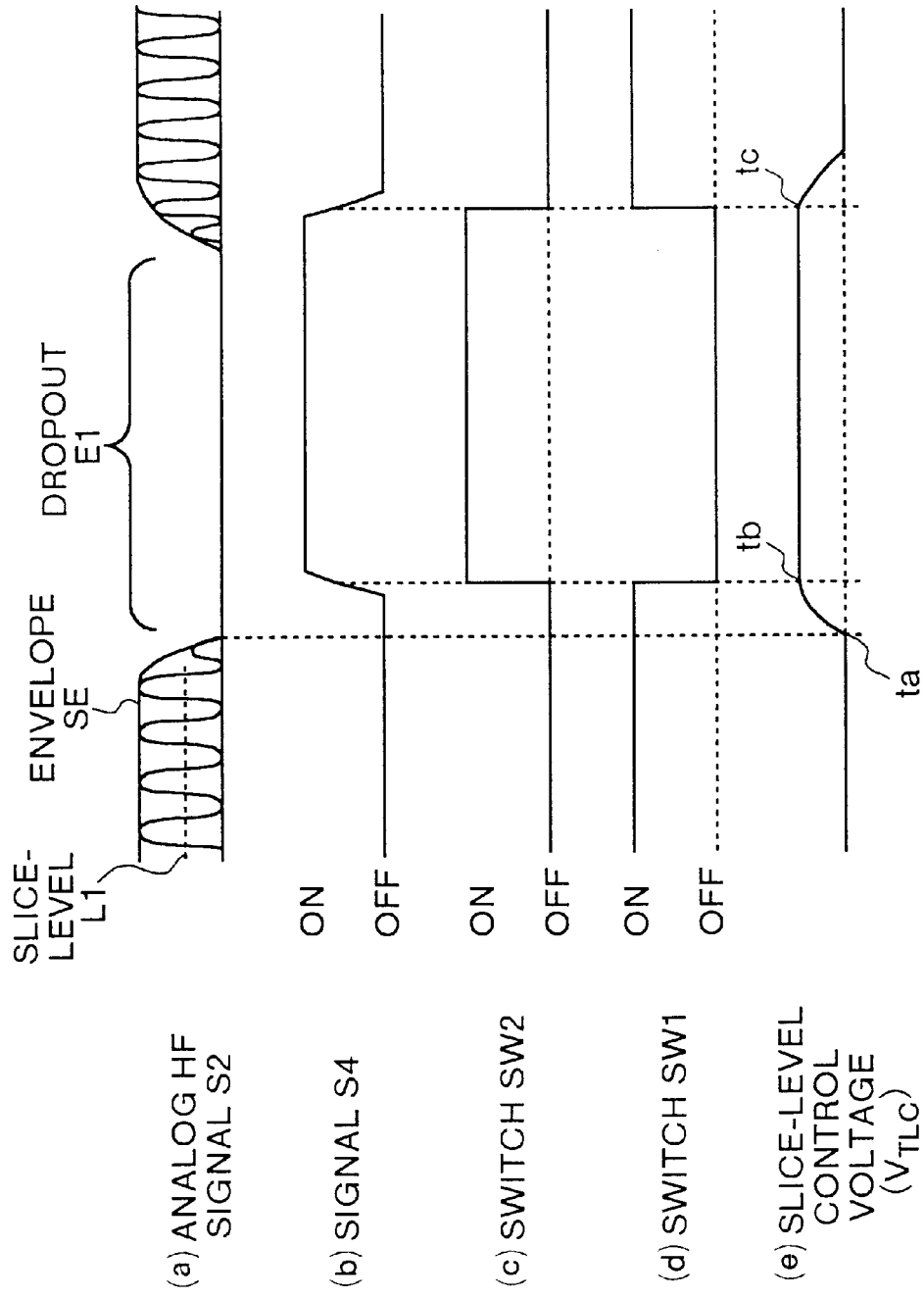
FIG. 2 is a timing chart that shows a slice level control operation of the signal detection circuit for an optical disk shown in FIG. 1.

A slice-level control operation when a dropout signal has occurred will now be explained with reference to a timing chart shown in FIG. 2. In FIG. 2, when a dropout E1 has not occurred in an input analog HF signal S2, the dropout signal detection circuit 2 sets a signal S4 to a low level and outputs this signal to the charge-pump circuit 4 and the switches SW1 and SW2. When the signal S4 is at the low level, the switch SW1 is turned ON to allow the charge-pump circuit 4 to start controlling the charge/discharge volume to the capacitor C4. When the signal S4 is at the low level, the switch SW2 is turned OFF to stop supplying a voltage to the connection point P1.

When the dropout signal E1 has occurred in the input analog HF signal S2, the dropout signal detection circuit 2 detects the dropout E1, and sets the signal S4 to a high level and outputs this signal to the charge-pump circuit 4 and the switches SW1 and SW2. When the signal S4 has become at the high level, the switch SW1 is turned OFF to make the charge-pump circuit 4 stop controlling the charge/discharge volume. When the signal S4 has become at the high level, the switch SW2 is turned ON to make the voltage follower 5 hold and output to the connection point P1 the voltage of the capacitor C4 immediately before the switch SW1 has been turned OFF. In other words, when the dropout E1 has occurred, a voltage at a time tb shown in (e) in FIG. 2 is held during the period while the switch SW2 is ON. Further, this voltage is output to the comparator 1 as the slice-level control voltage $V_{TLC}$. When the high-level signal S4 has been input to the charge-pump circuit 4 from the drop-out signal detection circuit 2, the charge-pump circuit 4 stops outputting the charge/discharge control to the capacitors C2 and C4, and is set to a high-impedance state.

According to the first embodiment, the slice-level control voltage $V_{TLC}$ at the time tb when the dropout E1 has been detected is held as the actual operation voltage. Thus, the slice level is controlled. Therefore, the variation in the slice-level control voltage $V_{TLC}$ is reduced, and a stable control of the slice level can be carried out while the dropout E1 exists. Further, the variation in the voltage of the slice level is reduced after the recovery from the dropout E1, and the digital HF signal S3 with few errors can be output to the digital signal processing circuit 3.

A second embodiment of the present invention will now be explained. The second embodiment has a structure from which the switch SW2 and the capacitor C2 of the first embodiment are deleted. Thus, the present embodiment is achieved by a simple structure of the first embodiment.

Figure 3:
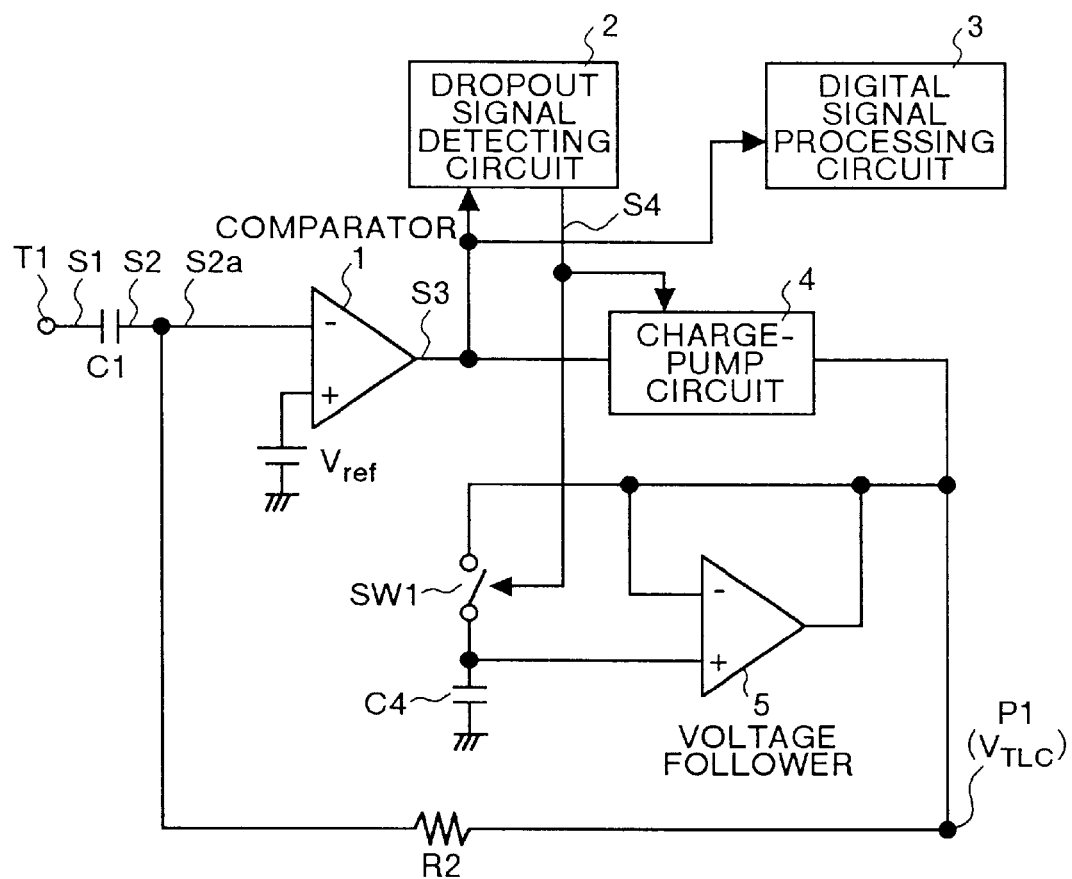
FIG. 3 is a block diagram that shows a construction of a signal detection circuit for an optical disk according to a second embodiment of the present invention.

FIG. 3 is a block diagram that shows a construction of a signal detection circuit for an optical disk according to a second embodiment of the present invention. The optical-disk signal detection circuit shown in FIG. 3 does not include the switch SW2 and the capacitor C2 shown in FIG. 1. Other constructions are identical to those of the first embodiment. Corresponding sections refer to the same reference numerals.

Figure 4:
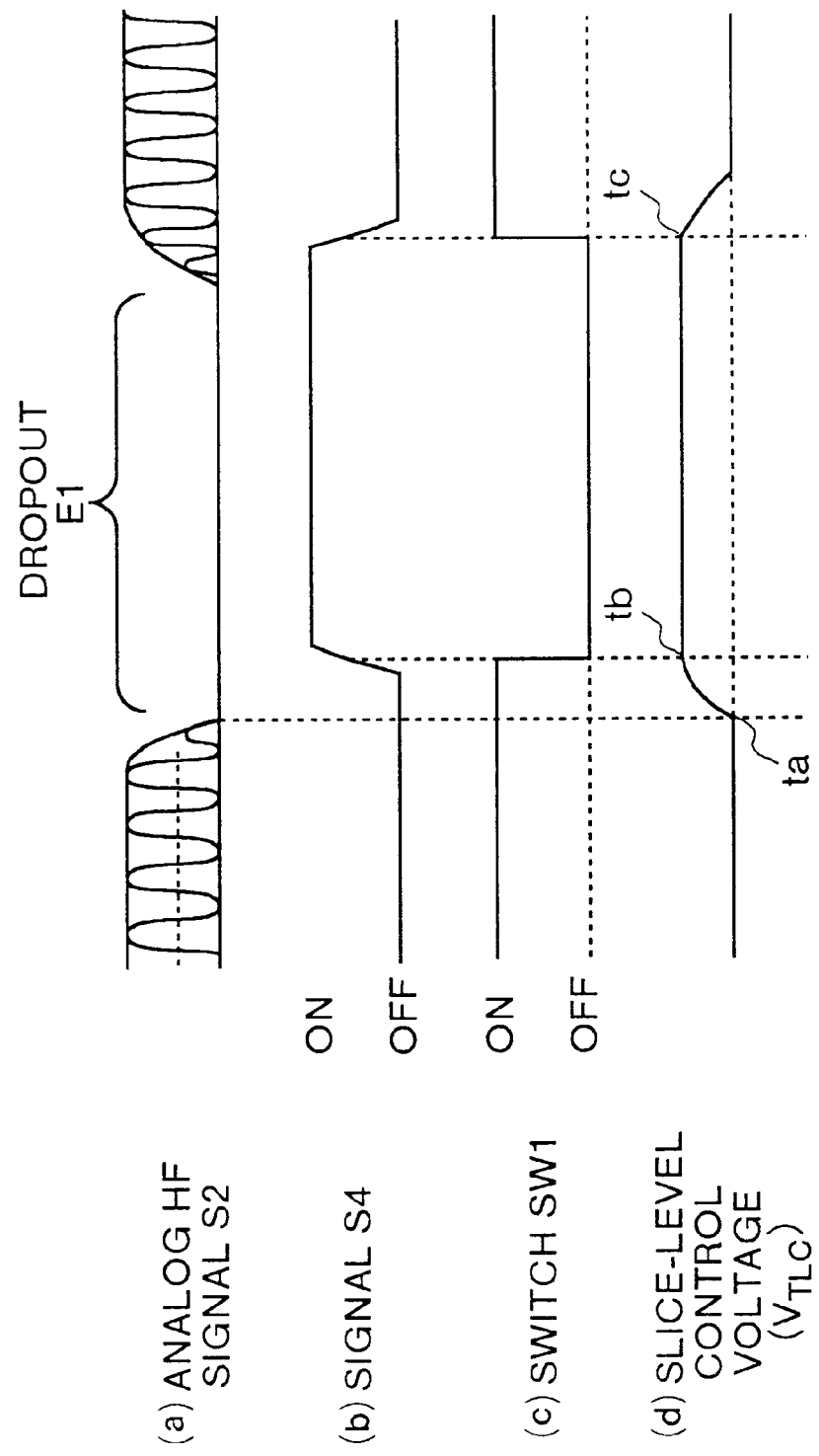
FIG. 4 is a timing chart that shows a slice level control operation of the signal detection circuit for an optical disk shown in FIG. 3.

A slice-level control operation carried out when a dropout signal has occurred will be explained with reference to a timing chart shown in FIG. 4. In FIG. 4, when a dropout E1 has not occurred in an input analog HF signal S2, the dropout signal detection circuit 2 sets a signal S4 to a low level and outputs this signal to the charge-pump circuit 4 and the switch SW1. When the signal S4 is at the low level, the switch SW1 is turned ON to allow the charge-pump circuit 4 to start controlling the charge/discharge volume to the capacitor C4.

When the dropout signal E1 has occurred in the input analog HF signal S2, the dropout signal detection circuit 2 detects the dropout E1, and sets the signal S4 to a high level and outputs this signal to the charge-pump circuit 4 and the switch SW1. When the signal S4 has become at the high level, the switch SW1 is turned OFF to allow the voltage follower 5 to hold and output to the connection point P1 the voltage of the capacitor C4 immediately before the switch SW1 has been turned OFF. In other words, when the dropout E1 has occurred, a voltage at a time tb shown in (d) in FIG. 4 is held, and this voltage is output as the slice-level control voltage $V_{TLC}$. When the high-level signal S4 has been input to the charge-pump circuit 4 from the dropout signal detection circuit 2, the charge-pump circuit 4 stops controlling the charge/discharge to the capacitor C4, and is set to a high-impedance state.

According to the second embodiment, the capacitors C2 and C4 in the first embodiment are changed to the capacitor C4 as a common capacitor. The slice-level control voltage $V_{TLC}$ at the time tb when the dropout E1 has been detected is held as the actual operation voltage. Thus, the slice level is controlled. Therefore, the variation in the slice-level control voltage $V_{TLC}$ is reduced, and stable control of the slice level can be carried out while the dropout E1 exists. Further, since the variation in the voltage of the slice level is reduced after the recovery from the dropout E1, a signal detection circuit for an optical circuit that can output the digital HF signal S3 with few errors to the digital signal processing circuit 3 can be provided in a simple structure.

A third embodiment of the present invention will now be explained. In the first and second embodiments, the occurrence of the dropout E1 is not recognized during the period from when the dropout E1 has occurred until when the signal S4 has been output. During this period, the charge-pump circuit 4 controls the slice-level control voltage $V_{TLC}$. The slice-level of the dropout E1 is controlled based on the voltage at the time tb when the signal S4 has been output. However, in the third embodiment, the slice-level of the dropout E1 is controlled based on the slice-level control voltage $V_{TLC}$ at the time immediately before the time ta when the dropout E1 has occurred.

Figure 5:
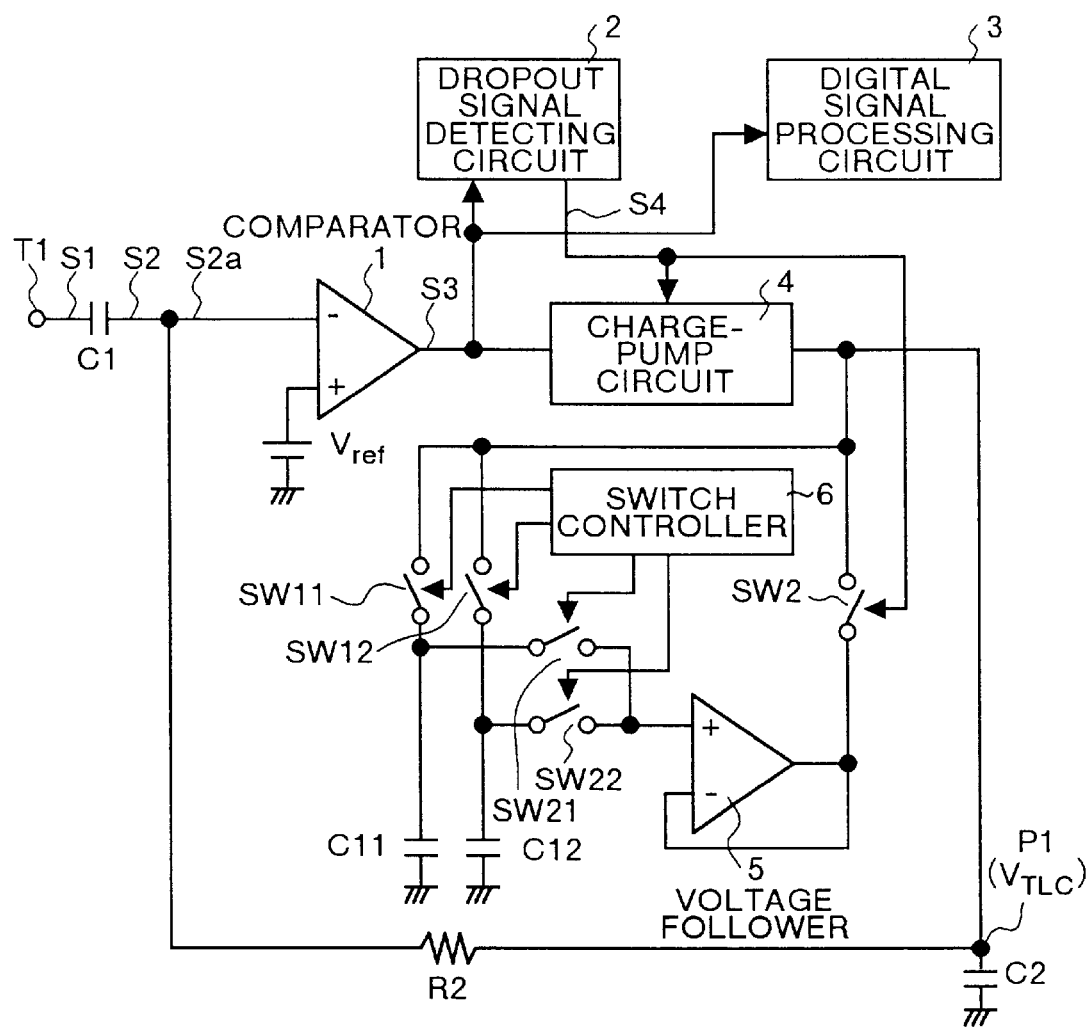
FIG. 5 is a block diagram that shows a construction of a signal detection circuit for an optical disk according to a third embodiment of the present invention.

FIG. 5 is a block diagram that shows a construction of a signal detection circuit for an optical disk according to the third embodiment of the present invention. In FIG. 5, the optical-disk signal detection circuit has two grounded capacitors C11 and C12 in place of the capacitor C4 of the first embodiment. Further, the optical-disk signal detection circuit has switches SW11 and SW12 for turning ON/OFF the sections between the capacitors C11 and C12 and a connection point P1, respectively, in place of the switch SW1 of the first embodiment. The optical-disk signal detection circuit also has switches SW21 and SW22. The switches SW21 and SW22 are connected between a plus (+) terminal of a voltage follower 5 and positive electrodes of the capacitors C11 and C12, respectively. The switches SW11, SW12, SW21 and SW22 are controlled by a switch controller 6. The switch controller 6 controls the switches SW11, SW12, SW21 and SW22 based on a signal S4 output from a dropout signal detection circuit 2. Other constructions are identical to those of the first embodiment. Corresponding sections refer to the same reference numerals.

Figure 6:
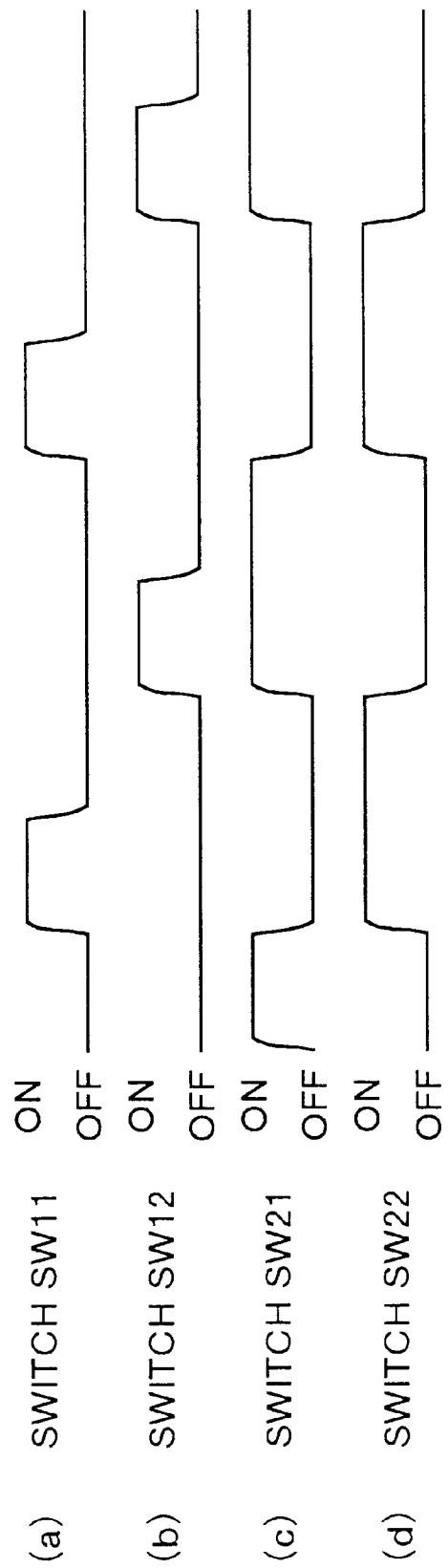
FIG. 6 is a timing chart that shows operation of a switch control section in the signal detection circuit for an optical disk shown in FIG. 5.

A switch control operation by the switch controller 6 will now be explained with reference to a timing chart shown in FIG. 6. In FIG. 6, the switch controller 6 keeps the switches SW11 and SW12 in an ON state alternately, for a predetermined period of time. When one of the switches SW11 and SW12 has been turned ON, the charge-pump circuit 4 carries out charging and discharging of the corresponding capacitors C11 and C12.

In the mean time, the switch controller 6 keeps the switches SW21 and SW22 in an ON state alternately, so that one of the switches SW21 and SW22 is always in the ON state.

Figure 7:
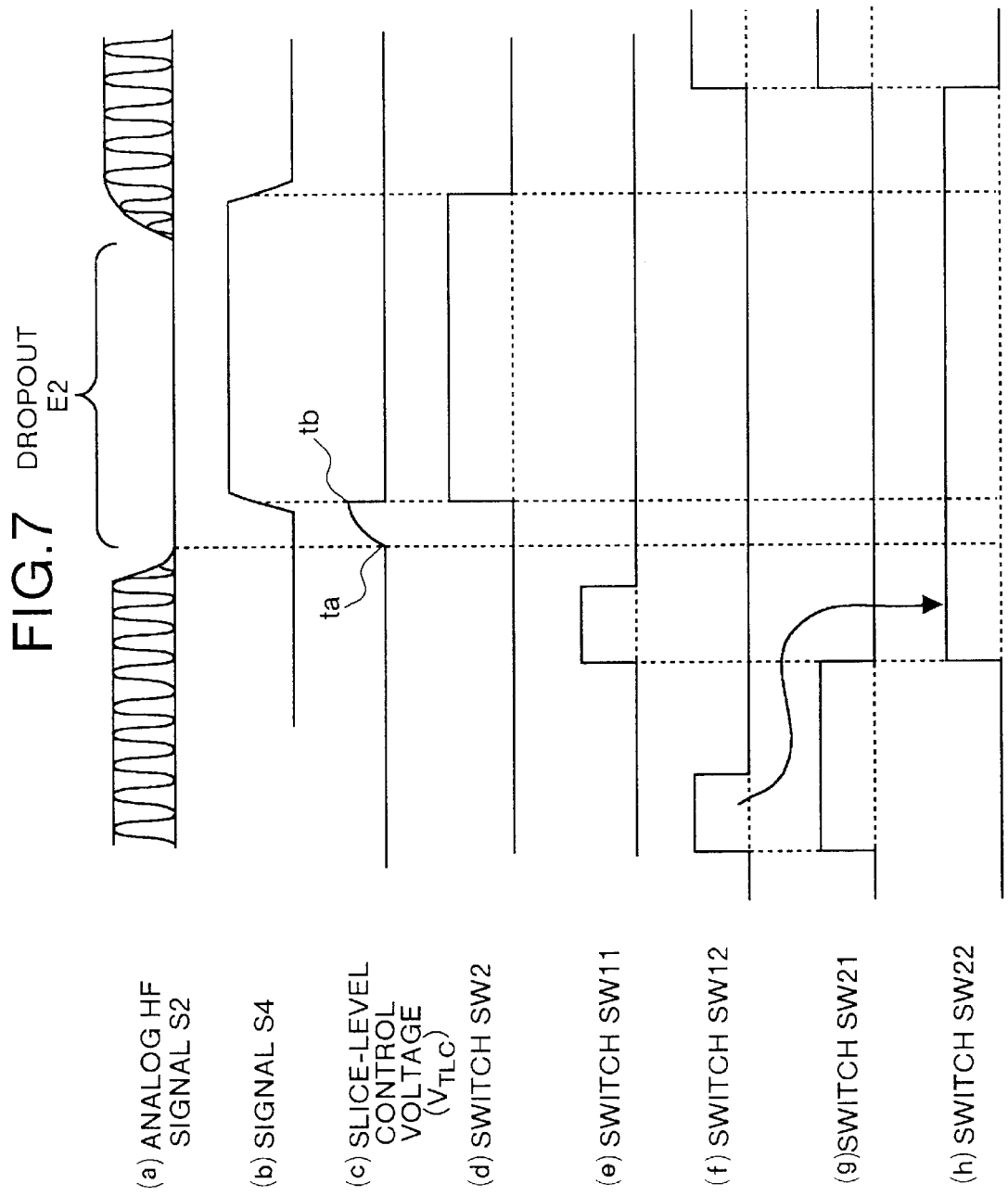
FIG. 7 is a timing chart that shows a slice level control operation of the signal detection circuit for an optical disk shown in FIG. 5.
Figure 8:
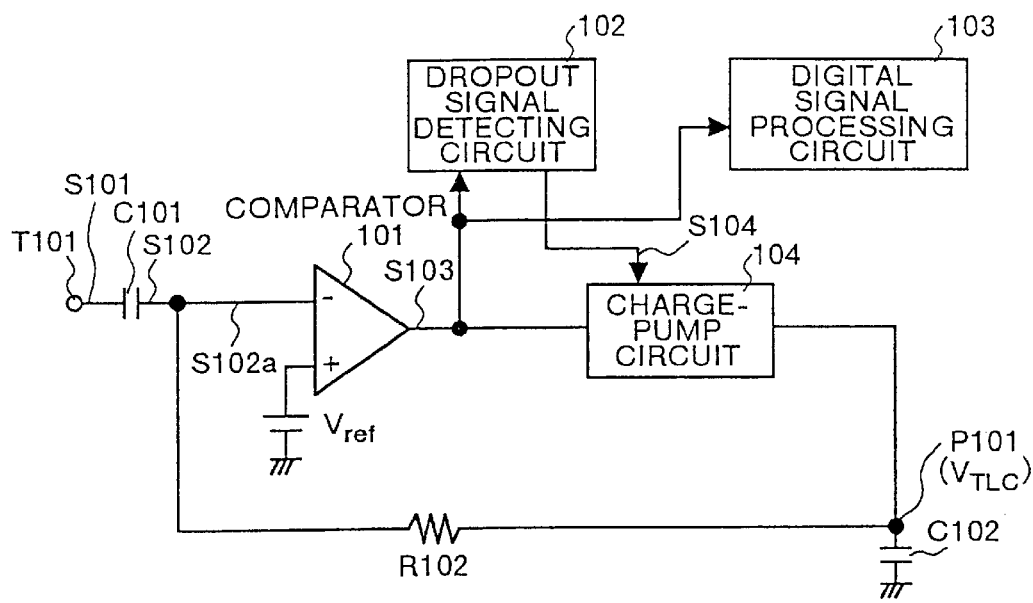
FIG. 8 is a block diagram that shows a construction of a conventional signal detection circuit for an optical disk.
Figure 9:
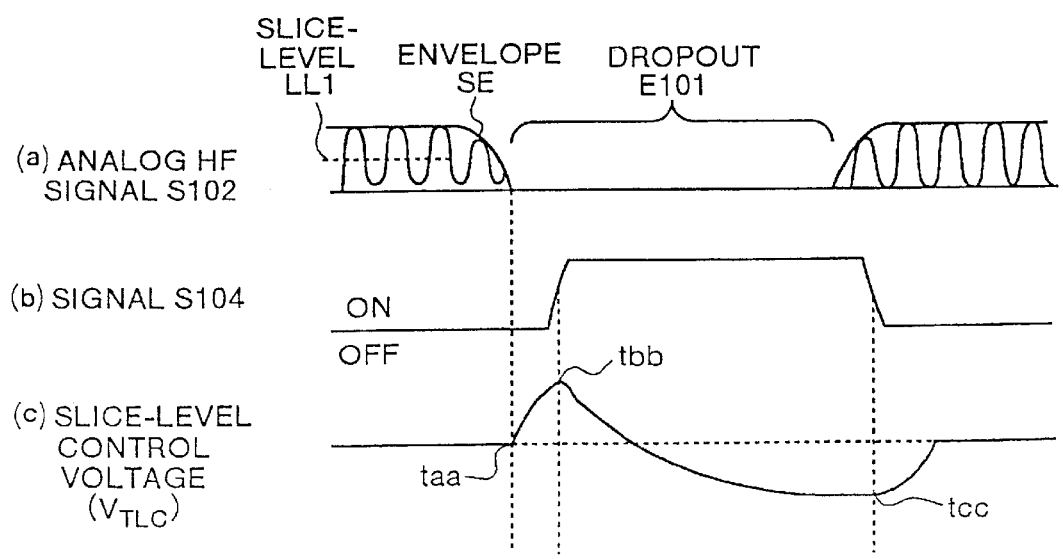
FIG. 9 is a timing chart that shows a slice-level operation in the conventional signal detection circuit for an optical disk shown in FIG. 8.

A slice-level control operation when a dropout E2 has occurred will now be explained with reference to a timing chart shown in FIG. 7. In FIG. 7, when the dropout E2 has not occurred in an analog HF signal S2, the switch controller 6 executes control of the switches SW11, SW12, SW21 and SW22 shown in FIG. 6, respectively. When the dropout E2 has not occurred in the input analog HF signal S2, the dropout signal detection circuit 2 sets a signal S4 to a low level and outputs this signal to the charge-pump circuit 4 and the switch SW2. When the signal S4 is at the low level, the switch SW2 is turned OFF to interrupt the voltage follower 5 from outputting to the connection point P1. The charge-pump circuit 4 continues controlling the charge/discharge quantity to the capacitor C2.

When the dropout signal E2 has occurred in the input analog HF signal S2, the dropout signal detection circuit 2 detects the dropout E2, and sets the signal S4 to a high level and outputs this signal to the charge-pump circuit 4 and the switch SW2. When the signal S4 has become the high level, the switch SW2 is turned ON to make the voltage follower 5 supply the voltage to the connection point P1. When the high-level signal S4 has been input to the charge-pump circuit 4 from the drop-out signal detection circuit 2, the charge-pump circuit 4 stops controlling the charge/discharge to the capacitor C2, and is set to a high-impedance state.

At the time tb when the switch SW2 is turned ON, there has been carried out the charge/discharge control of the slice-level control voltage $V_{TLC}$ to the capacitor C2. Therefore, the voltage varies depending on a time constant determined by the capacitor C2 and the resistor R2. However, at the time tb, the switches SW11, SW12 and SW21 are in the OFF state, and only the switch SW22 is in the ON state, based on the setting by the switch controller 6, as shown in FIG. 7. Thus, when the switch SW2 is turned ON at the time tb, the switch SW22 is in the ON state. Therefore, the voltage stored in the capacitor C12 is supplied to the plus (+) terminal of the voltage follower 5 through the switch SW22. The voltage follower 5 holds this voltage stored in the capacitor C12, and outputs this voltage to the connection point P1 through the switch SW2. The voltage stored in the capacitor C12 is the voltage stored through the switch SW12 before the dropout E2 has occurred. Therefore, the voltage of the slice level during a period before the dropout E2 has occurred is supplied to the connection point P1.

The switches SW11, SW12, SW21 and SW22 then hold the state of the time tb respectively so long as the switch SW2 is in the ON state, that is, so long as the dropout E2 continues. Thus, the voltage follower 5 continues to supply to the connection point P1 the voltage of the slice level that has been obtained before the dropout E2 has occurred. When the switch SW2 has been turned OFF thereafter, the supply of the voltage to the point P1 by the voltage follower 5 is stopped. Then, the charge-pump circuit 4 starts controlling the charge/discharge to the capacitor C2. The switches SW11, SW12, SW21 and SW22 start the switching operation as shown in FIG. 6 respectively.

The two capacitors C11 and C12 are provided in the above-explained third embodiment. However, instead of this construction, a plurality of capacitors may also be provided so that the voltage stored in each capacitor is held and output.

According to the third embodiment, after the time tb when the dropout E2 has been detected, the slice-level control voltage $V_{TLC}$ is held at the voltage immediately before the time ta at the occurrence of the dropout E2. The slice level is controlled at this voltage. Accordingly, the slice-level control voltage $V_{TLC}$ during the period of the dropout E2 becomes the voltage same as the voltage obtained before the slice-level control voltage $V_{TLC}$ has occurred. Therefore, the variation in the slice-level control voltage $V_{TLC}$ is reduced, and a stable control of the slice level can be carried out while the dropout E2 exists. Further, the variation in the voltage of the slice level is reduced after the recovery from the dropout E2, the digital HF signal S3 with few errors can be output to the digital signal processing circuit 3.

As explained above, according to the one aspect of this invention, when the dropout-detection unit is in a normal state of not detecting a dropout of the analog signal, the first and second voltage-storing units store the voltages of slice levels controlled by the slice-level control unit. When the dropout-detection unit has detected a dropout of the analog signal, the voltage-holding unit holds the voltage of the slice level stored in the second voltage-storing unit. The voltage held by the voltage-holding unit is fed back to the converting unit. During the period of the dropout of the analog signal, the voltage-holding unit holds the voltage of the slice level at the time of the detection of the dropout of the analog signal, as an actual operation voltage. Therefore, the variation in the voltage of the slice level corresponding to the dropout of the analog signal is reduced, and a stable control of the slice level can be carried out. Further, the variation in the voltage of the slice level is reduced after the recovery from the dropout, and digital signal with few errors can be output.

According to another aspect of this invention, when the dropout-detection unit is in a normal state of not detecting a dropout of the analog signal, the voltage-storing unit stores the voltage of slice level controlled by the slice-level control unit. When the dropout-detection unit has detected a dropout of the analog signal, the voltage-holding unit holds the voltage of the slice level stored in the voltage-storing unit. The voltage held in the voltage-holding unit is fed back to the converting unit. During the period of the dropout of the analog signal, the voltage-holding unit holds the voltage of the slice level at the time of the detection of the dropout of the analog signal, as an actual operation voltage. Therefore, based on a simple shared structure of voltage-storing units, the variation in the voltage of the slice level corresponding to the dropout of the analog signal is reduced, and stable control of the slice level can be carried out. Further, the variation in the voltage of the slice level can be produced after the recovery from the dropout, and an output digital signal with few errors can be obtained.

According to still another aspect of this invention, when the dropout-detection unit is in a normal state of not detecting a dropout of the analog signal, the third change-over switch is set to the OFF state. The first to third voltage-storing units store the voltages of slice levels controlled by the slice-level control unit. The slice level is controlled at the voltage stored in the first voltage-storing unit. In this case, the changeover control unit always controls the first and second changeover switches to make the second and third voltage-storing units store voltages alternately. While the second voltage-storing unit stores the voltage, the voltage stored in the third voltage-storing unit is output to the voltage-holding unit. While the third voltage-storing unit stores the voltage, the voltage stored in the second voltage-storing unit is output to the voltage-holding unit. When the dropout-detection unit has detected a dropout of the analog signal, the third changeover switch is set to the ON state. The voltages stored in the second and third voltage-storing units are output alternately through the voltage-holding unit. The slice level is controlled at this voltage. With this arrangement, the slice level immediately before the occurrence of the dropout of the analog signal is used as the slice level at and after the point of time of the detection of the dropout of the analog signal. Thus, the voltage of the slice level is controlled securely and stably. Therefore, the variation in the voltage of the slice level corresponding to the dropout of the analog signal is reduced, and a stable control of the slice level can be carried out. Further, the variation in the voltage of the slice level is reduced after the recovery from the dropout, and an output digital signal with less error can be carried out.

Further, the voltage-holding unit is realized by a voltage follower. Therefore, when a dropout of the analog signal has occurred, a voltage of the slice level is stably and surely supplied, and a digital signal with less error can be output.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A signal detection circuit for an optical disk comprising:
   a converting unit which converts an analog signal read from an optical disk into a digital signal by using a slice level;
   a dropout-detection unit which detects a dropout of the analog signal based on an envelope of the digital signal;
   a slice-level control unit which controls the slice level when said dropout-detection unit has not detected a dropout of the analog signal;
   a first voltage-storing unit which stores a voltage of a slice level to be controlled by said slice-level control unit;
   a second voltage-storing unit which stores a voltage of a slice level to be controlled by said slice-level control unit;
   a voltage-holding unit which holds and outputs a voltage stored in said second voltage-storing unit; and
   a change-over switch which holds the voltages of the slice levels stored in said first and second voltage-storing units when a dropout of the analog signal has not been detected, and which connects said second voltage-storing unit to said voltage-holding unit so said voltage-holding unit feeds back the voltage of the slice level stored in said second voltage-storing unit to said converting unit when a dropout of the analog signal has been detected.

2. The signal detection circuit for an optical disk according to claim 1, wherein said voltage-holding unit is a voltage follower.

* * * * *